(12) United States Patent  
Utin

(10) Patent No.: US 9,292,674 B2  
(45) Date of Patent: Mar. 22, 2016

(54) PASSWORD ENCRYPTION KEY

(71) Applicant: Cambridge Interactive Development Corp., Cambridge, MA (US)

(72) Inventor: Daniil Utin, Needham, MA (US)

(73) Assignee: Cambridge Interactive Development Corp., Cambridge, MA (US)

( * ) Notice: Subject to any disclaimer, the term of this patent is extended or adjusted under 35 U.S.C. 154(b) by 0 days.

(21) Appl. No.: 13/896,633

(22) Filed: May 17, 2013

(65) Prior Publication Data

US 2013/0326228 A1 Dec. 5, 2013

Related U.S. Application Data

(63) Continuation of application No. 10/532,541, filed as application No. PCT/US03/33589 on Oct. 23, 2003, now Pat. No. 8,447,990.

(60) Provisional application No. 60/421,284, filed on Oct. 25, 2002.

(51) Int. Cl.
| | |
|---|---|
| *G06F 21/31* | (2013.01) |
| *G06F 21/62* | (2013.01) |
| *H04L 9/08* | (2006.01) |
| *H04L 9/32* | (2006.01) |

(52) U.S. Cl.
CPC ............. *G06F 21/31* (2013.01); *G06F 21/62* (2013.01); *G06F 21/6245* (2013.01); *H04L 9/0863* (2013.01); *H04L 9/0894* (2013.01); *H04L 9/3226* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 5,210,795 | A | 5/1993 | Lipner et al. |
| 5,398,285 | A | 3/1995 | Borgelt et al. |
| 5,402,492 | A | 3/1995 | Goodman et al. |
| 5,611,048 | A | 3/1997 | Jacobs et al. |
| 5,623,637 | A | 4/1997 | Jones et al. |
| 5,734,718 | A | 3/1998 | Prafullchandra |
| 5,757,920 | A | 5/1998 | Misra et al. |
| 5,787,169 | A | 7/1998 | Eldridge et al. |
| 5,802,176 | A | 9/1998 | Audebert |
| 5,956,408 | A | 9/1999 | Arnold |

(Continued)

FOREIGN PATENT DOCUMENTS

WO        WO 00/79368        12/2000

OTHER PUBLICATIONS

Supplementary European Search Report issued in EP application No. 03809956, dated Jun. 16, 2010, 3 pages.

*Primary Examiner* — Michael R Vaughan
(74) *Attorney, Agent, or Firm* — Fish & Richardson P.C.

(57) ABSTRACT

A password-encrypted key (PEK) is generated from a user-supplied password or other identifying data and then used to encrypt the user's password. The encrypted password is stored in a user record on a server. At login a would-be user's password is again used to make a key, which is then used to decrypt and compare the stored encrypted password with the would-be user's password to complete the login. The successful PEK is stored in a temporary session record and can be used to decrypt other sensitive user information previously encrypted and stored in the user record as well as to encrypt new information for storage in the user record. A public/private key system can also be used to maintain limited access for the host to certain information in the user record.

6 Claims, 8 Drawing Sheets

(56) References Cited

U.S. PATENT DOCUMENTS

| | | |
|---|---|---|
| 5,999,711 A | 12/1999 | Misra et al. |
| 6,044,155 A | 3/2000 | Thomlinson et al. |
| 6,047,072 A | 4/2000 | Field et al. |
| 6,064,736 A | 5/2000 | Davis et al. |
| 6,073,237 A | 6/2000 | Ellison |
| 6,128,742 A | 10/2000 | Felt |
| 6,178,508 B1 | 1/2001 | Kaufman |
| 6,272,631 B1 | 8/2001 | Thomlinson et al. |
| 6,370,649 B1 | 4/2002 | Angelo et al. |
| 6,549,626 B1 | 4/2003 | Al-Salqan |
| 6,704,868 B1 | 3/2004 | Challener et al. |
| 6,718,468 B1 | 4/2004 | Challener et al. |
| 6,826,686 B1 | 11/2004 | Peyravian et al. |
| 6,904,526 B1 | 6/2005 | Hongwei |
| 6,959,390 B1 | 10/2005 | Challener et al. |
| 6,971,016 B1 | 11/2005 | Barnett |
| 6,983,377 B1 | 1/2006 | Beesley et al. |
| 6,986,050 B2 | 1/2006 | Hypponen |
| 7,051,213 B1 | 5/2006 | Kobayashi et al. |
| 7,131,001 B1 | 10/2006 | Johnson |
| 7,143,294 B1 | 11/2006 | Johnson |
| 7,373,517 B1 | 5/2008 | Riggins |
| 7,451,147 B1 * | 11/2008 | Kao ................. G06F 21/31 |
| 7,581,111 B2 | 8/2009 | Wagner et al. |
| 8,447,990 B2 | 5/2013 | Utin |
| 2001/0056541 A1 | 12/2001 | Matsuzaki et al. |
| 2002/0056040 A1 * | 5/2002 | Simms ......................... 713/171 |
| 2002/0172363 A1 | 11/2002 | Dierks et al. |
| 2002/0184509 A1 | 12/2002 | Scheidt et al. |
| 2003/0046593 A1 | 3/2003 | Xie et al. |
| 2003/0074566 A1 | 4/2003 | Hypponen |
| 2003/0093680 A1 | 5/2003 | Astley et al. |
| 2003/0177364 A1 | 9/2003 | Walsh et al. |
| 2004/0034771 A1 | 2/2004 | Edgett et al. |
| 2006/0156026 A1 | 7/2006 | Utin |

* cited by examiner

PASSWORD ENCRYPTION KEY

CLAIM OF PRIORITY

This application is a continuation application and claims priority under 35 USC §120 to U.S. patent application Ser. No. 10/532,541 filed on Nov. 17, 2005, U.S. Pat. No. 8,447, 990to issue on May 21, 2013, which claims priority to PCT Application No. PCT/US2003/033589filed on Oct. 23, 2002, which claims benefit under 35 USC 119(e) to U.S. patent application Ser. No. 60/421,284 filed on Oct. 25, 2002, the entire contents of which are hereby incorporated by reference.

TECHNICAL FIELD

This invention relates to eSecurity and more particularly to user authentication.

BACKGROUND

A frequently neglected aspect of the modem enterprise data storage is sensitive user information security. The most widespread approach used today is encryption of such user information as Social Security number, credit card numbers, e-mails, etc. with a single key and storage of the resulting encrypted data in the database. The logic behind such solution is that a malicious individual who gains access to the database will be unable to make use of the user's sensitive data because it is encrypted.

Unfortunately, this approach provides a false sense of security in most cases. The problem is that the encryption key used to encrypt all records still needs to be stored somewhere in the system. For example, as soon as the system is required to send e-mail to the user or submit user's credit card number to the merchant account, the server(s) responsible for fulfilling that requirement must use the key to decrypt user information retrieved from the database. Chances are that if a malicious individual manages to get access to the database, which is usually the most protected part of the system, he will then be able to gain access to the aforementioned server. As soon as this happens, such malicious individual will be able to obtain the key and decrypt every database record encrypted with this key.

SUMMARY

A password-encrypted key (PEK) is generated from a user-supplied password, for example, and then used to encrypt the user's password. The encrypted password is stored in a user record on a server. At login, a would-be user's password is again used to make a key, which is then used to decrypt and compare the stored encrypted password with the would-be user's password to complete the login. The successful PEK is stored in a temporary session record and can be used to decrypt other sensitive user information previously encrypted and stored in the user record as well as to encrypt new information for storage in the user record. A public/private key system can also be used to maintain limited access for the host to certain information in the user record.

According to one aspect of the invention, a secure transaction process includes generating a key from a user-supplied unencrypted password or other identifying data, encrypting the user's password with the key, creating a user record and storing the encrypted password in the user record. In another aspect of the invention, upon user login, a key is made from a would-be user's password using the same algorithm used to generate the key from the originally supplied unencrypted password, then the encrypted password in the corresponding user record is retrieved and decrypted using the key and the decrypted password and the would-be user-supplied password are compared to see if they match.

In the preferred process, if the decrypted password and user-supplied password match, a temporary session record is created and the key is stored in the session record. In the absence of a match, the user login procedure for secure or user-authenticated transactions at least would preferably be aborted or terminated in some fashion.

The key may be used to encrypt other sensitive user data, which can be stored in the user record. During a session in which a session record has been created, the key stored in the session record can be used to decrypt the other encrypted information stored in the user record for use in carrying out some desired action.

Alternatively, a public/private key pair or other asymmetric cryptography can be employed. A public/private key pair is generated and the public key is stored on an application server and the mating private key only on another server, preferably a secure off-site server. The original user-supplied unencrypted password is then encrypted with the public key and stored on the application server. Subsequently, the private key can be fetched from the other server and used to decrypt selected information on the one server, for example, for a mass mailing. A single public/private key can support the entire site.

The password encryption key (PEK) system of the present invention eliminates one of the shortcomings of prior methods by using a unique encryption key for each user record. This key is based on at least one piece of data—user password. Optionally, user name (or user ID) can be used in conjunction with user password. User's password (and name) is obtained at each successful user login and is maintained by the system for the duration of that user's session.

The details of one or more embodiments of the invention are set forth in the accompanying drawings and the description below. Other features, objects, and advantages of the invention will be apparent from the description and drawings, and from the claims.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

PEK Integration into the System

The PEK system is illustrated as a sequence of processes as shown in FIGS. 1, 3, 5 and 6, running on an application server or other computer system. Preferably all of the processes are carried on the Internet on a server that hosts a given application accessed remotely by a user from his or her personal computer, for example.

Figure 4:
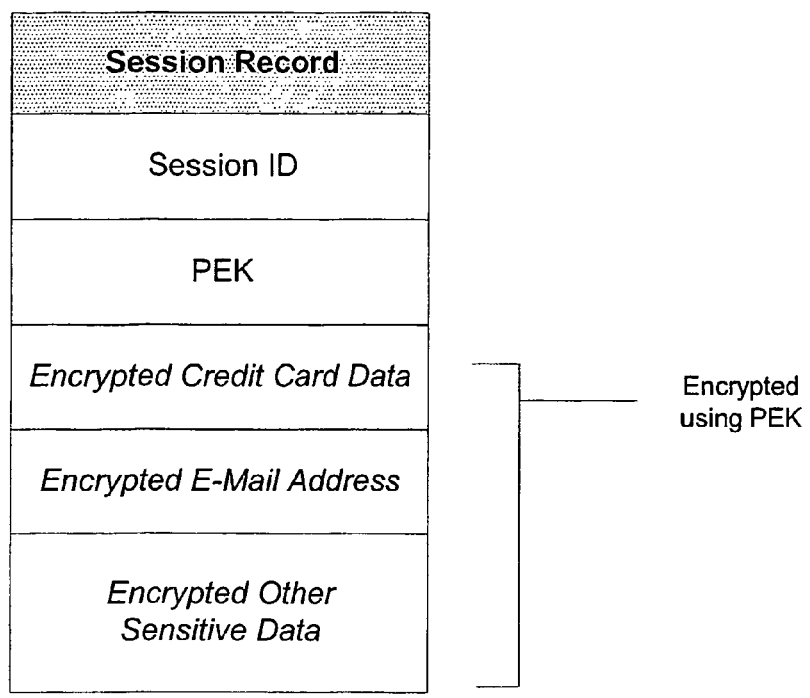
FIG. 4 is a data structure diagram of the session record.
Figure 5:
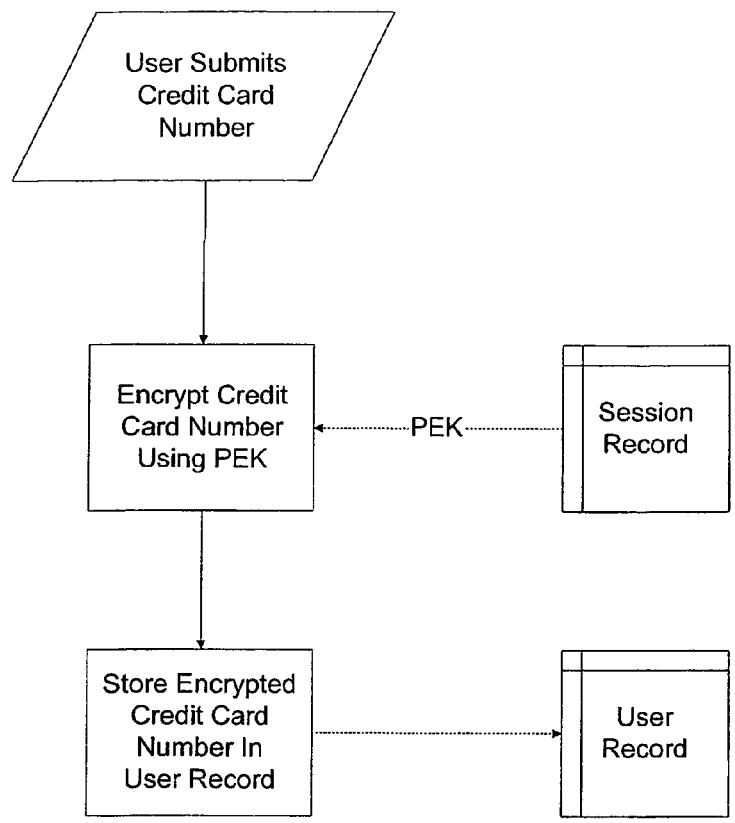
FIG. 5 is a flowchart showing a process for safely storing sensitive information.
Figure 6:
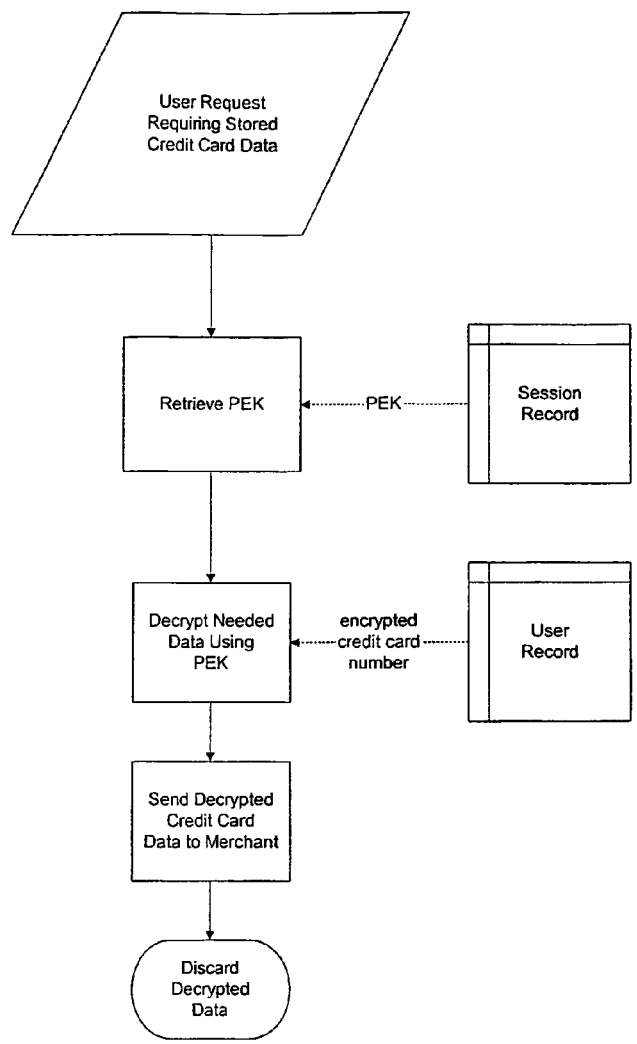
FIG. 6 is a flowchart showing the process for safely retrieving and using stored sensitive information, which has been encrypted.

1. User Registration Process (FIG. 1)
   a. User registers by, at least, providing new username and an arbitrary password.
   b. Generate a key from the password. (and optionally username/ID). A key can be generated by calculating an MD5 checksum of the source data.
   c. Encrypt user password with the key obtained at step 1b. Note: other sensitive data provided during registration (i.e. e-mail address) should also be encrypted with the same key.
   d. Create new user record (FIG. 2) and store username, encrypted password and other optional data (sensitive data encrypted) in that user record.
2. User Login Process (FIG. 3)
   a. User logs in providing username/password for authentication.
   b. Generate a key from the password (and optionally username/ID). This key should be identical to the key obtained at step 1b.
   c. Retrieve user record by username and decrypt user password using the key obtained at step 2b.
   d. Compare the decrypted password to the one provided by user at step 2a.
   e. Reject user login if passwords do not match. Abort login process.
   f. If passwords match, create a temporary user session record (FIG. 4) that will exist for the duration of the user session. (A user session is a temporary data pool created after user login and destroyed as a result of explicit user logout or session timeout. Session timeout occurs after a certain pre-determined period of user inactivity.)
   g. Store resulting key in the session.
   h. Communicate session ID back to the user (client application). Session ID is a number or string uniquely identifying the session. Once user (client application) receives the session ID from the system, user will always provide that ID with each subsequent request for the duration of the session. This enables the system to get access to user session data at each request.
3. Sensitive Information Storage (FIG. 5)
   a. User submits some sensitive data (i.e. Credit Card number).
   b. Encrypt sensitive data with a key retrieved from user's session.
   c. Store encrypted data in user's record if it is to be permanently maintained on the server. If it is only to be available for the session then the encrypted data would be stored only temporarily in the session record.
4. Sensitive Information Retrieval (FIG. 6)
   a. User requests some system action requiring use of the information stored at step 3. (i.e. user decides to make a purchase with the credit card that he/she previously submitted to the system).
   b. Retrieve a key (i.e., the PEK) from the user's session record (FIG. 4).
   c. Decrypt the necessary data using the key obtained at step 4b.
   d. Perform the required action with decrypted data (i.e. send it to the merchant account)
   e. Discard decrypted data.

Implications

Figure 1:
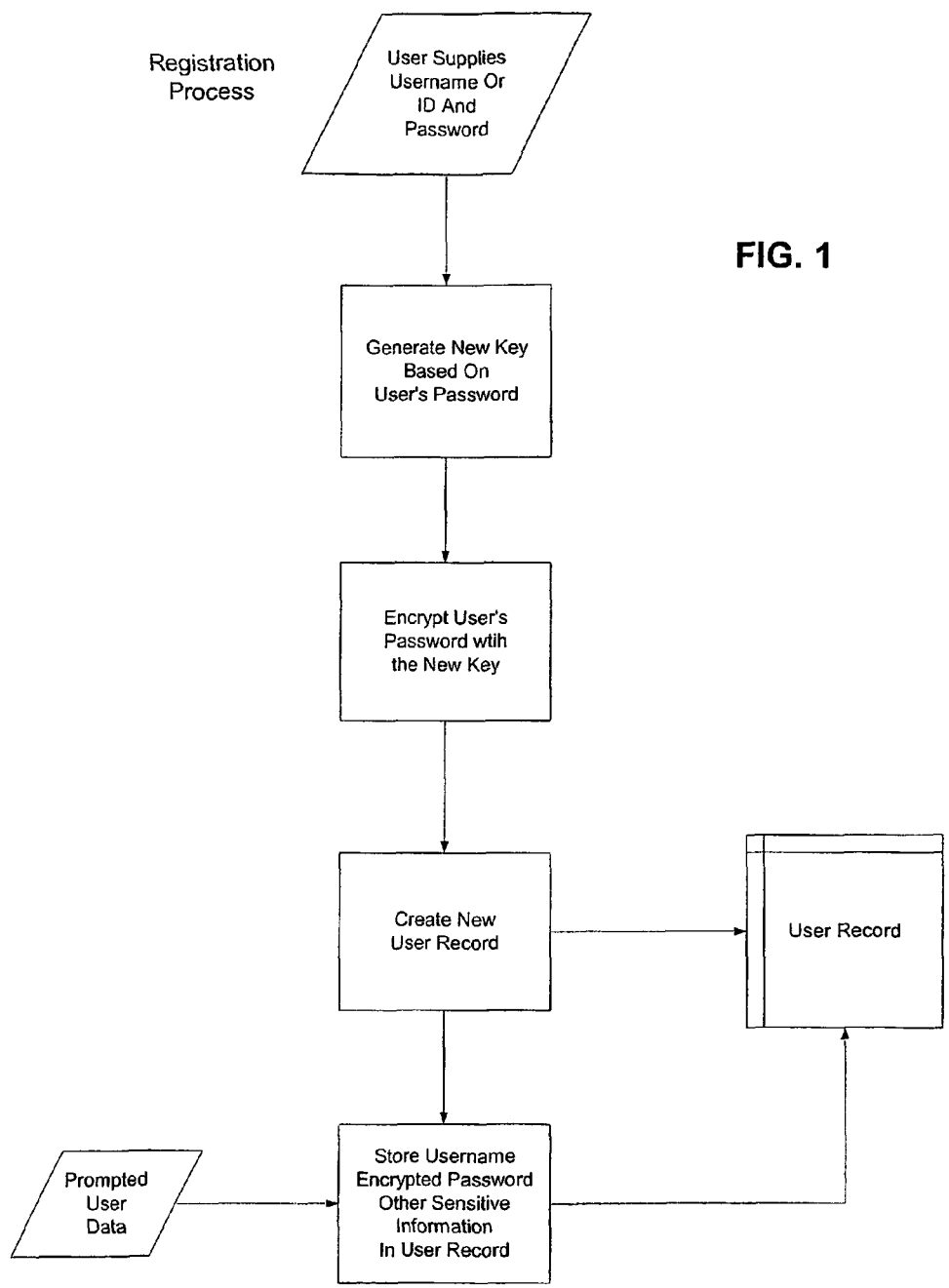
FIG. 1 is a flowchart showing the user registration process.
Figure 2:
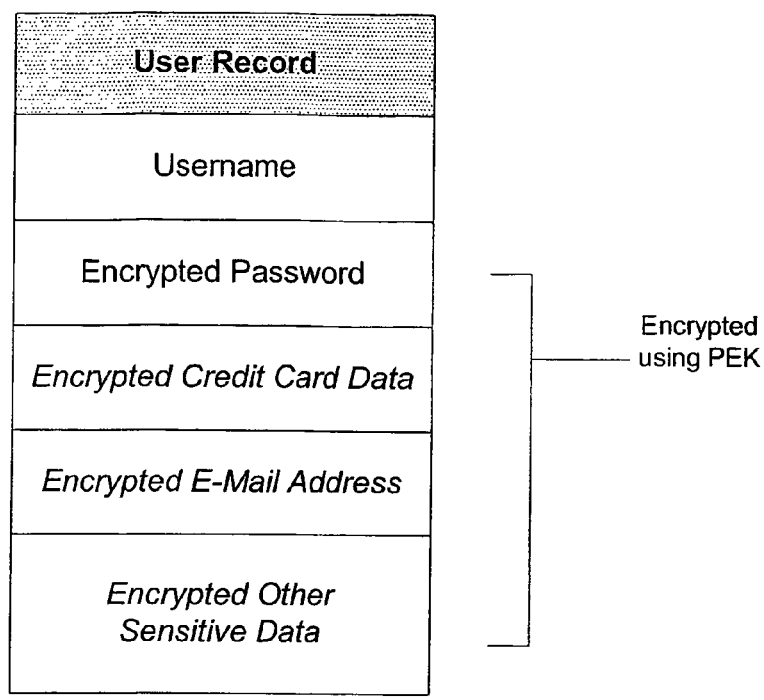
FIG. 2 is a data structure diagram of the user record.
Figure 3:
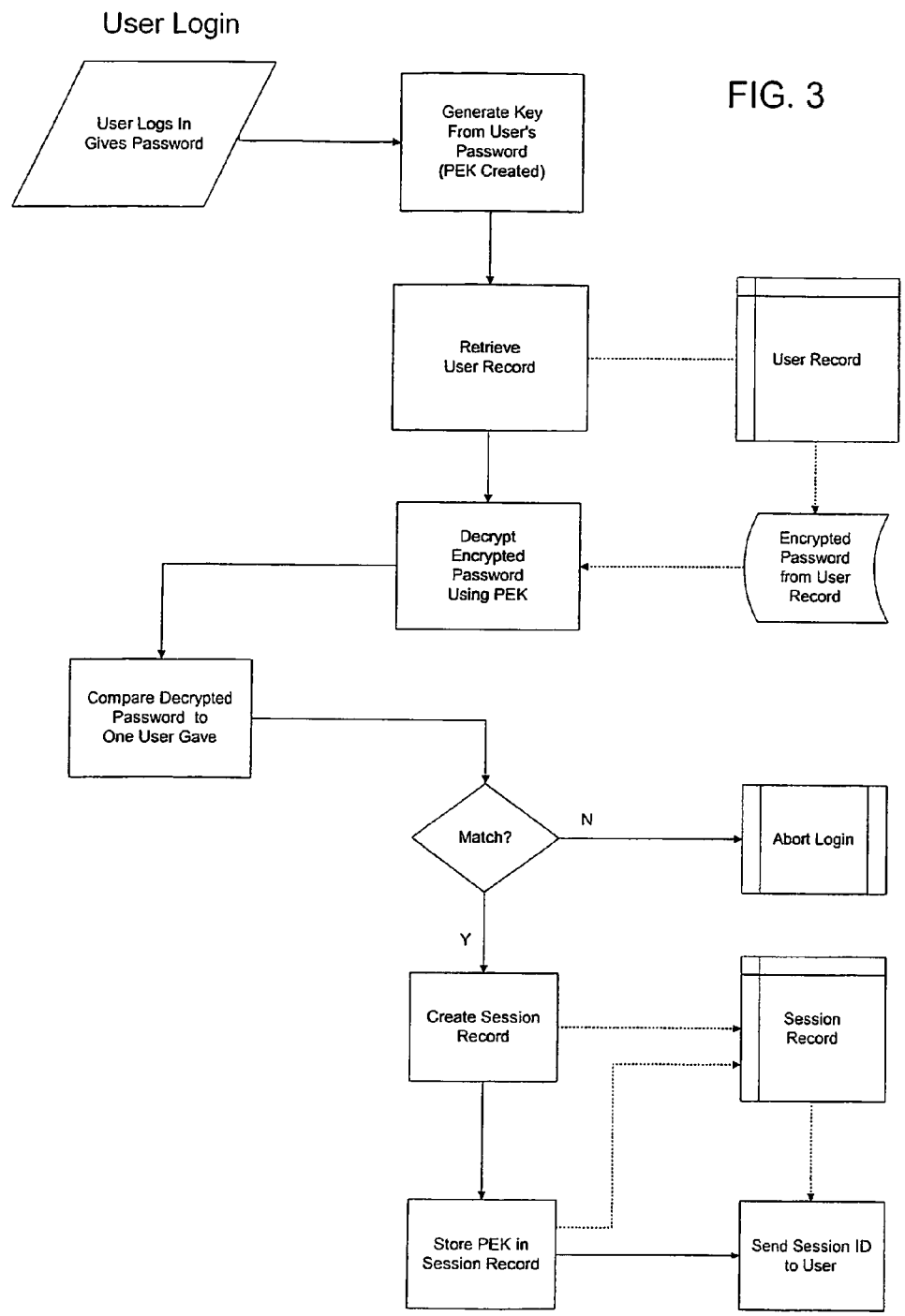
FIG. 3 is a flowchart showing the user login process.

The system, at user's request, can decrypt data stored in the database at step 3 (FIG. 5). at any time while that user's session is active. As soon as user's session expires, it should be impossible to decrypt this user's sensitive information without knowing the user's password. Note that user's password is also encrypted at step 1c (FIG. 1).

Thus, a user's sensitive data will always be as secure as the user's password in this system. In the majority of cases, this should be acceptable since knowledge of password only gives access to sensitive user account information through the standard interface anyway.

Potential Vulnerabilities and Solutions

While PEK offers a secure way of protecting user data for users that are not currently logged in, in theory, it could be possible for a malicious individual to gain access to sensitive data for users that are currently logged in (i.e. have active sessions going). Such individual would have to obtain all of the encrypted user data and all of the active sessions data, extract a key from each session, and decrypt the active user's sensitive data by applying extracted keys to corresponding user records.

Logged in users, however, in most cases, represent only a small subset of all registered users and that alone greatly limits the scope of potential risks. In addition, the exposure can be further limited by making sure that the information linking session to a specific user, like username/ID, is not stored in session data. Instead, this information can be provided by the client application with each user's request. That alone would make it exceedingly difficult for a malicious individual to match a key, retrieved from any given session, to a specific user record.

Other Considerations

PEK makes it difficult to perform legitimate system functions that involve access to sensitive user data without an explicit user request. Bulk mailing to all system users is a good example. Suppose that user e-mails or at least e-mail addresses are encrypted using PEK. It will then be impossible for the system to decrypt user e-mails because each e-mail is encrypted with its owner's password and that password itself is also encrypted.

Figure 7:
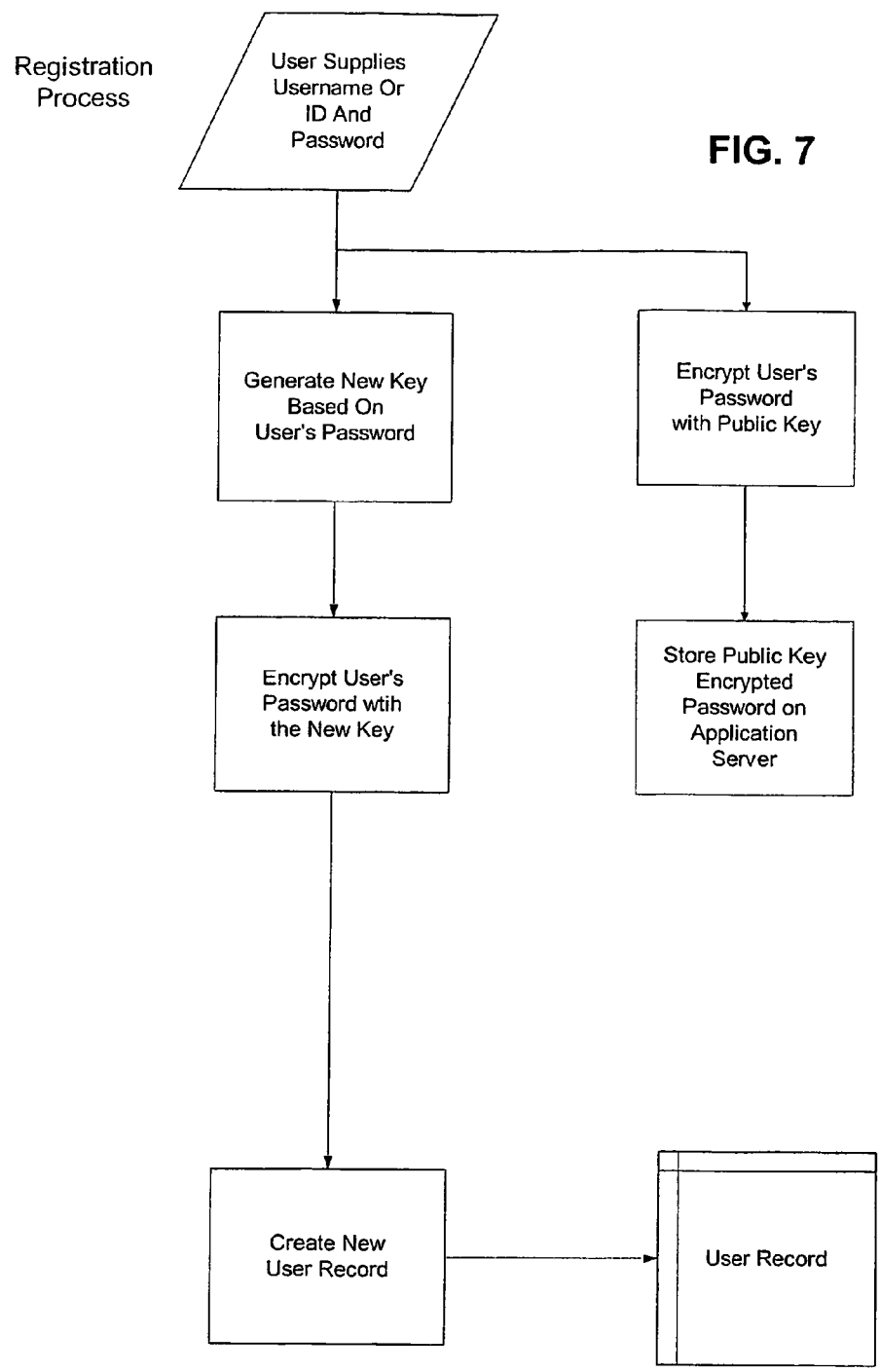
FIG. 7 is a flowchart showing an alternative registration process using a public key.
Figure 8:
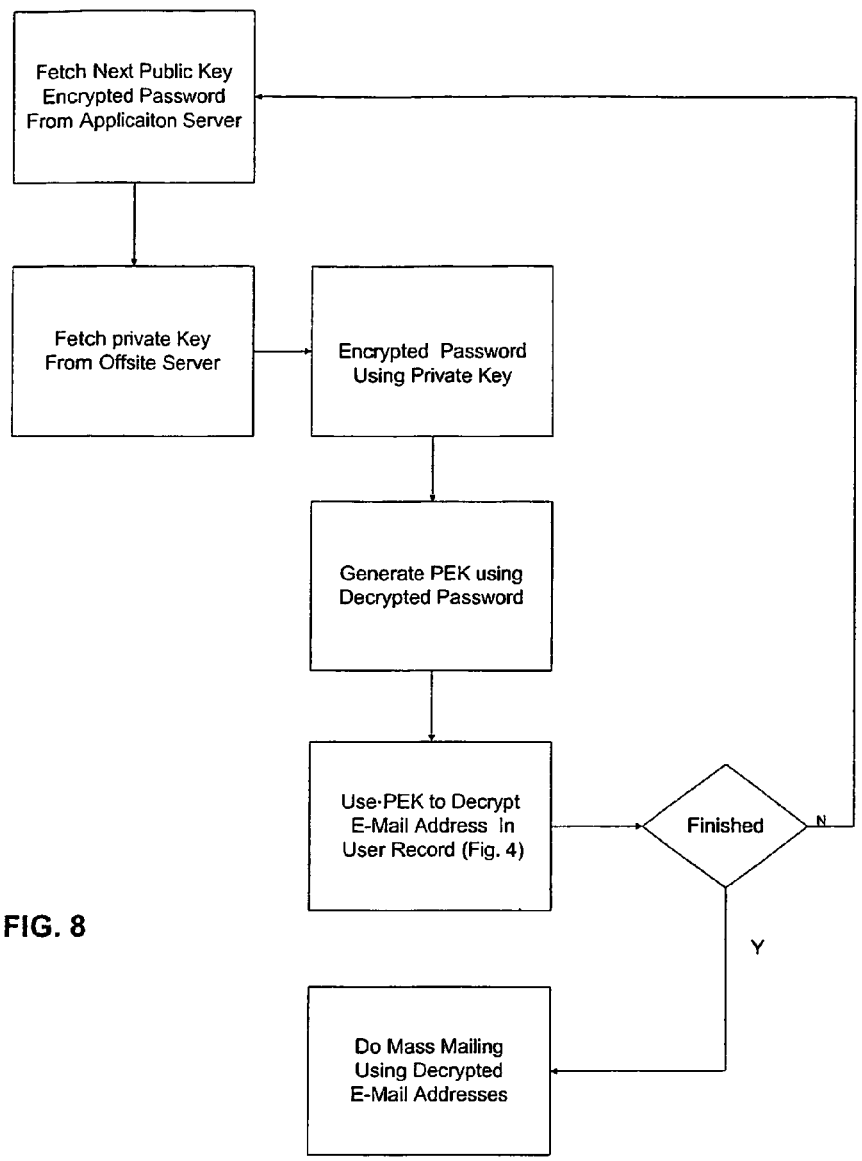
FIG. 8 is a flowchart showing the process for extracting e-mail addresses using public/private key pairs stored in the process of FIG. 7.

One solution to this problem is to utilize asymmetric cryptography, like PGP, and keep a copy of the user's password, encrypted with a public key, in the main database, as shown in FIG. 7. Only one pair of public/private keys for the entire site needs to be generated in advance; then the public key, used for encryption, should be stored on the application server, while the private key, used for decryption, should be stored on an off-site secure server. This server, at the time of bulk mailing, as shown in FIG. 8, will decrypt user's password using that private key, generate user's PEK as described in step 1b, and, finally, decrypt required information using PEK. The main advantage of this approach is that it should be possible to keep the server, which maintains the private key, either off-site or in a special security zone. This setup will ensure that while this server will be able to access the system data, the system would not be able to access the server. To further enhance security, this server can also be completely inaccessible (i.e. down) when bulk operations are not in progress.

Another approach is to use the public key to directly encrypt only those user record fields that require bulk access. Distinct public/private key pairs can be used to encrypt different field types (i.e. e-mails and Credit Card numbers). This would allow, for a more refined access permissions control.

For example, bulk mail server will only have a private key that decrypts e-mails, but not Credit Card numbers.

Finally, yet another approach could be to push unencrypted data to the off-site server at the time of its submission by user. This is the least secure approach but it allows the most flexibility.

A number of embodiments of the invention have been described. Nevertheless, it will be understood that various modifications may be made without departing from the spirit and scope of the invention. For example, instead of MD5 checksum, some other encryption algorithm or reproducible key-making methodology could be used. Accordingly, other embodiments are within the scope of the following claims.

What is claimed is:

1. A computer-implemented method, comprising:

upon receiving, at a server, data from a computing device that represents a user login password, generating a key from the would-be user's password by calculating a checksum;

retrieving a corresponding user record;

decrypting an encrypted password in the user record using the key, the encrypted password being encrypted by using an unencrypted password previously provided by the user and a previously generated key, wherein the previously generated key is generated from the previously provided unencrypted password;

comparing the decrypted password and the user login password to determine if they match; and if the decrypted password and user login password match, creating a temporary session record and storing the key in the session record, otherwise aborting the user login, the stored key being usable to decrypt other encrypted information stored in the user record during a session.

2. The computer-implemented method of claim 1, further comprising:

generating a public/private key pair, storing the public key on an application server and the mating private key only on another server, encrypting the previously provided unencrypted password with the public key and storing the public-key encrypted password on the application server, and fetching the private key from the other server and using it to decrypt selected information on the application server.

3. The computer-implemented method of claim 2, wherein the other server is a secure offsite server.

4. A computer-executable program residing on a server, the execution of the program causing the server to:

upon receiving, at the server, data from a computing device that represents a user login password, generating a key from the would-be user's password by calculating a checksum;

retrieving a corresponding user record;

decrypting an encrypted password in the user record using the key, the encrypted password being encrypted by using an unencrypted password previously provided by the user and a previously generated key, wherein the previously generated key is generated from the previously provided unencrypted password;

comparing the decrypted password with the user login password to determine if they match; and if the decrypted password and user login password match, creating a temporary session record and storing the key in the session record, otherwise aborting the user login, the stored key being usable to decrypt other encrypted information stored in the user record during a session.

5. A computing device comprising:

a memory configured to store instructions; and a processor configured to execute instructions to perform operations comprising:

upon receiving data from a computing device that represents a user login password, generating a key from the would-be user's password by calculating a checksum;

retrieving a corresponding user record;

decrypting an encrypted password in the user record using the key, the encrypted password being encrypted by using an unencrypted password previously provided by the user and a previously generated key, wherein the previously generated key is generated from the previously-supplied unencrypted password;

comparing the decrypted password with the user login password to see if they match; and if the decrypted password and user login password match, creating a temporary session record and storing the key in the session record, otherwise aborting the user login, the stored key being usable to decrypt other encrypted information stored in the user record during a session.

6. The computing device of claim 5, wherein the processor is configured to execute instructions to perform operations comprising:

encrypting sensitive user data using the previously generated key;

storing the encrypted sensitive user data in the user record;

using the key to decrypt the stored encrypted sensitive user data; and storing the decrypted sensitive user data in the temporary user session record.

* * * * *

UNITED STATES PATENT AND TRADEMARK OFFICE
CERTIFICATE OF CORRECTION

PATENT NO. : 9,292,674 B2
APPLICATION NO. : 13/896633
DATED : March 22, 2016
INVENTOR(S) : Daniil Utin Page 1 of 1

It is certified that error appears in the above-identified patent and that said Letters Patent is hereby corrected as shown below:

Column 1, Line 7-8, delete "8,447,990to" and insert -- 8,447,990 to --, therefor.

Column 1, Line 9, delete "PCT/US2003/033589filed" and insert -- PCT/US2003/033589 filed --, therefor.

Column 1, Line 9, delete "Oct. 23, 2002," and insert -- Oct. 23, 2003, --, therefor.

Signed and Sealed this
Thirty-first Day of May, 2016

Michelle K. Lee
*Director of the United States Patent and Trademark Office*